Figure 1:
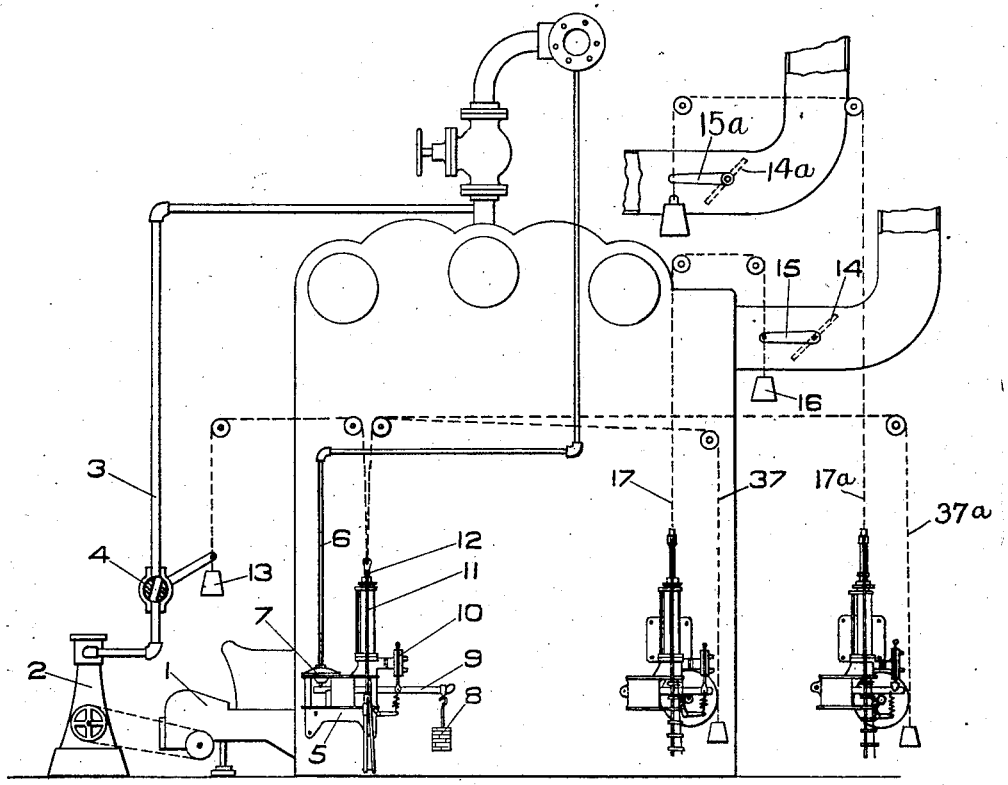

Nov. 17, 1925.

J. L. KIMBALL 1,562,338

APPARATUS FOR CONTROLLING COMBUSTION

Filed Feb. 11, 1924   2 Sheets-Sheet 1

INVENTOR.
James L Kimball

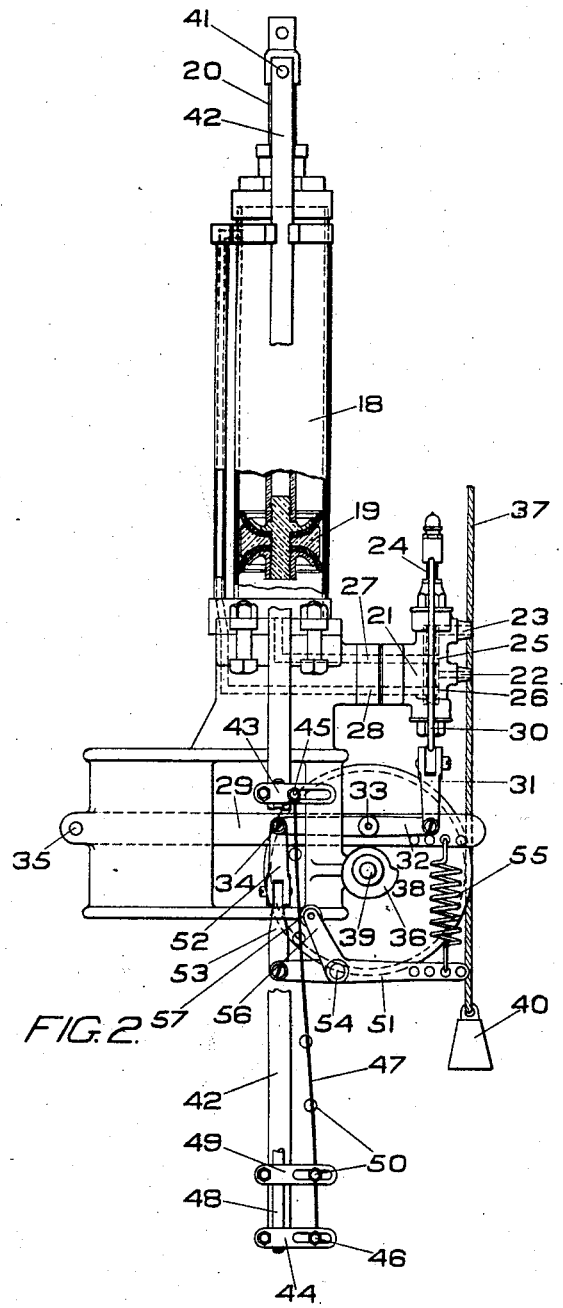

Patented Nov. 17, 1925.

1,562,338

UNITED STATES PATENT OFFICE.

JAMES LEWIS KIMBALL, OF SALEM, MASSACHUSETTS, ASSIGNOR TO RUGGLES-KLINGEMANN MFG. CO., OF SALEM, MASSACHUSETTS, A CORPORATION OF MASSACHUSETTS.

APPARATUS FOR CONTROLLING COMBUSTION.

Application filed February 11, 1924. Serial No. 692,050.

*To all whom it may concern:*

Be it known that I, JAMES LEWIS KIMBALL, a citizen of the United States, residing at 9 Dearborn St., Salem, in the county of Essex and State of Massachusetts, have invented certain new and useful Improvements in Apparatus for Controlling Combustion, of which the following is a specification.

This invention relates to apparatus for automatically controlling combustion in a steam boiler furnace in accordance with variations in steam pressure generated by said boiler.

One of the objects of the invention is to provide independent regulators for the control of uptake dampers of a plurality of steam boilers, said regulators being actuated by mechanical means from a master regulator which derives its motion from variations in pressure and which is used to control the fuel feed.

Another object of the invention is to provide means in the control of the mechanically operated regulator whereby known variable factors in the control will be compensated for and thereby maintain a predetermined relation between the fuel and air supply.

A further object of my invention is to effect intermittent operation of the draft control regulator from a uniform operation of the fuel control regulator thereby reducing the number of operations of the draft control regulator and minimizing the number of disturbances in furnace conditions. In controlling air and fuel supply the fuel feed should be controlled uniformly from load or pressure variations, while the air supply should be controlled step by step, and at each stepped position the fuel controlling regulator should have a limited operation without effecting operation of the draft control regulator. In my invention the air control regulator is not responsive to small fluctuations in the fuel control regulator, the operation is intermittently effected by steps each stage of operation requiring a predetermined degree of operation of the fuel controlling regulator for smaller movements of the fuel control regulator the draft control regulator is not responsive. In this way it will be seen that my invention reduces the number of disturbances in the regulation of the furnace draft and therefore the furnace efficiency approaches more nearly to the efficiency to be gained by a fixed air supply.

The invention is arranged to be used in conjunction with any desired type of regulator in which its operation is controlled from pressure. For the purpose of illustrating my invention, I have shown in the accompanying drawings the regulator which is actuated from pressure as controlling the fuel feed, and my invention which is actuated by mechanical means as controlling the boiler damper. But, it should be understood that this is only a preferred arrangement and that the pressure regulator could be used to control the damper if so desired, and my invention used to control the fuel feed, or any other arrangement of control which under existing conditions seemed desirable could be used without departing from the scope of my invention.

The present day practice is to control both fuel feed and air supply from one regulator, but this gives a uniform movement to the damper and the fuel feed from a uniform variation in pressure and does not take into account the variable gas flow past the damper. Uniform pressure variation should produce a uniform variation in air supply and not a uniform damper movement.

My invention provides a powerful damper regulator with a variable control to compensate for these variable characteristics. One or more of these regulators being operated from a master regulator and the master regulator being operated from either the pressure of the steam generated by the boiler, so the pressure of gases generated in the furnace.

In the accompanying drawings forming a part of this specification, Figure 1 is a diagrammatic view showing a steam boiler with fuel feeding mechanism and an engine for driving the fuel feeder, also a regulator which is controlled in accordance with the steam generated in the boiler for controlling the speed of the stoker engine. This regulator also controlling the operation of a regulator which controls the boiler damper. Figure 2 shows a vertical section of the damper regulator, a part being shown in section for a clearer understanding of its operation.

Referring first to Figure 1, (1) designates an automatic stoker for feeding fuel to the boiler furnace which may be of any desired type. (2) designates an engine for driving the stoker. Engine (2) has steam supply pipe (3) and throttling valve (4). A regulator (5) has steam pressure connection (6), and operates to control throttling valve (4) from variations in pressure generated by the boiler or boilers. This regulator can be of any desired or conventional type, a preferred embodiment of a regulator suitable for carrying out my invention being disclosed in my application, Serial No. 630,289, of April 6, 1923, but it should be understood that any other type of regulator which is controlled from pressure and which will effect a uniform variation in stoker speed from a uniform variation in pressure, will be suitable for carrying out this invention.

In the operation of this preferred regulator, the steam pressure acts on a flexible diaphragm (7) and this pressure is counteracted by weights (8) attached to beam (9). Variations in steam pressure operate beam (9) to control a pilot valve (10) and pilot valve (10) controls an independent pressure supply to operate fluid pressure motor (11). Fluid pressure motor (11) has a piston operating in a cylinder connected to piston rod (12) and this rod is in turn connected by means of a cord or other connecting means with throttling valve (4). If a cord or cable connection is used then a counterweight (13) is used to operate valve (4) in one direction, while the regulator operates the valve in the other direction.

It should be understood that on an increase in steam pressure piston rod (12) will operate in an upward direction to close throttling valve (4) and likewise on a decrease in steam pressure piston rod (12) will operate in a downward direction to open throttling valve (4).

While we have explained the operation of this regulator from steam pressure, it should be understood that any regulator suitable for controlling stoker speed from furnace pressure could be used without departing from the scope of this invention. Each individual boiler is provided with a damper having damper arm (15), and a counterweight (16) for closing the damper, and each individual damper is provided with an individual regulator for controlling its respective damper by means of suitable connections (17) with the damper arm.

I will now explain the novel features in the operation of this invention:—

Referring to Figure 2, (18) designates a fluid pressure motor having piston (19) and piston rod (20), a pilot valve (21) controls an independent pressure supply for operating piston (19), the inlet for pressure is at (22) and exhaust at (23). This valve can be of any preferred arrangement in which the admission and exhaust of fluid pressure will effect the operation of the piston (19). A suitable valve for this purpose is shown in my prior Patent No. 1,405,039, of June 31st, 1922. The pilot valve stem (24) has cylindrical portions (25) and (26) which control the admission and exhaust to opposite ends of the motor cylinder (18), the stem being shown in a neutral position in which no water or other fluid pressure can be admitted or exhausted to or from the motor cylinder (18); when the stem (24) is raised, pressure is admitted at port (27) to operate the piston (19) in an upward direction at the same time exhaust port (28) is opened to the atmosphere, allowing pressure to escape from the top of the cylinder, and when the stem is lowered, the action is reversed, pressure being admitted at port (28) and exhausted at port (27), and piston (19) is operated on the downward stroke.

It should be explained that pressure exhausted from the top of the motor cylinder is discharged into the bottom cavity of the pilot valve where it is discharged through a cored passage not shown to the top cavity of the valve and water goes to waste through exhaust connection (23).

From the foregoing it will be seen that an upward movement of the valve stem (24) will operate the piston (19) and piston rod (20) in an upward direction, and likewise a downward movement of the stem (24) will operate piston (19) and piston rod (20) in a downward direction. The valve spindle (24) is operated by movements of a beam (29) through yoke connections (30) and (31) to floating lever (32). Floating lever (32) is pivoted to the beam (29) at point (33). The left hand end (34) being held stationary while the beam is moving the valve stem (24) to either an upper or lower pressure position.

The beam (29) is pivoted at point (35), the opposite end being moveable by means of a cam (36). This cam derives its motion for operating the beam (29) by means of cable (37) which extends around pulley (38), pulley (38) being secured to cam shaft (39) and operates the cam (36) in one direction by the counter-weight (40), and in the other direction by the travel of piston rod (12) of the pressure regulator (5).

It is understood that I do not limit myself to the described details of operating the pilot valve of the damper regulator from the operation of the piston rod of the regulator that is actuated from variations in steam or other pressure and that the described details of construction might be modified in various ways without departing from the spirit of this invention.

We will now show how my novel compensating attachment which is operated from the piston rod (20) effects a variable cut-off giving a variable control over the movement of the piston (19) from a uniform motion imparted to the cam (36) and thereby governs the movement of the dampers in such a way as to effect a uniform air and fuel supply in the proper ratio for the entire cycle of control. It will be understood that what is required is a uniform variation in the gas flow and fuel feed from a uniform variation of the steam pressure generated by the boilers. It will also be understood that the first closing movement of the damper is not so effective in checking the draft as the final closing movement, therefore, what is required is a variable movement to the damper from a uniform pressure variation to compensate for the variable gas flow past such dampers.

It should also be understood that the conditions of the gas flow or draft varies in different boilers of the same generating system. Those boilers nearest the main stack or chimney usually getting a greater draft than those located at the extreme ends of the battery. It is for this reason that all dampers must not only have a variable movement in relation to the fuel feed, but the individual damper should be provided with a variable movement in relation to other dampers. A uniform variation in fuel feed and a uniform variation in gas flow for each individual boiler, from a uniform pressure variation of the steam generated by all the boilers, is what is required.

Attached to piston rod (20) at point (41) is a bar (42) which moves up and down with the piston rod (20), and attached to this bar are upper and lower slotted arms (43) and (44). Screw studs (45) and (46) are clamped in the slotted ends of arms (43) and (44). A flexible steel blade (47) has its upper end attached to stud (45) and its lower end to stud (46).

It will be seen that the angle of this flexible blade can be varied by the studs being moved in or out in the slotted ends of these arms. These upper and lower arms also carry rod (48) to which is clamped other arms (49) of similar construction, only one being shown, the rod being broken and other arms left off for the purpose of clearness in showing the connection back of this compensating attachment. These last named arms are arranged to be adjusted vertically in relation to each other, and have studs (50) arranged to be adjusted in and out in the slotted ends of these adjustable arms (49). Studs (50) are of similar construction to studs (45) and (46) except that they are not fastened to the flexible blade, but simply act as a guide for the blade. It will be seen that this flexible steel blade can be clamped so as to form any curve required within the limits of adjustment of the studs.

Floating lever (32) is connected at point (34) with compensating lever (51) by means of links (52) and (53). This compensating lever has a pivoted bearing at point (54), the bracket for this bearing being supported by the frame of the regulator, but not shown in the drawing. The right hand end of compensating lever (51) is connected with the beam (29) by means of a spiral spring (55), arm (56) is secured to lever (51) and has roll (57) at its upper end. Roll (57) is held in engagement with the flexible blade (47) by means of spring (55).

In the operation of this regulator, variations in the movement of the piston rod (12) of pressure regulator (5) will operate cam (36), an upward movement effecting an upward movement of beam (29), and an upward movement of the pilot valve stem (24) which in turn will effect an upward movement of piston (19). These upward motions of the two regulators are in the direction to slow down the stoker engine and close the flue damper. Likewise a downward movement of piston rod (12) caused by a decrease in steam pressure will effect a speeding up of the stoker engine and likewise downward movement of piston rod (20) to open the flue damper.

Referring to Figure 2, it will be seen that when the beam (29) is raised by means of cam (36), that the pilot valve stem (24) will be moved to a pressure position which will admit water at port (27) and open port (28) to exhaust, this will operate piston (19) in an upward direction. The movement of the piston (19) will cause a similar motion to be imparted to the flexible blade (47) and this motion will continue until the roll (57) comes in contact with one of the studs (50) and this will give a rocking motion to lever (51) and floating lever (32) which will return the pilot valve stem (24) to its neutral or cut-off position. There will be some compensating effect imparted to the valve between the location of the studs by the curvature of the flexible blade (47), but these studs will effect an abrupt closing of the valve to prevent a further movement of the piston rod (20). Assuming a downward movement of piston rod (12) on a decrease in steam pressure, cam (36) will operate beam (29) to lower valve stem (24) and admit pressure at port (28) and open port (27) to exhaust which will operate piston (19) on the downward stroke and the flexible blade will impart motion to rock compensating arm (51) and floating lever (32) to again return the pilot valve stem to a neutral or cut-off position.

From the foregoing, it will be seen that the movement of the cam (36) will move the pilot valve stem (24) to either one or the other of its pressure positions for operating the piston (19), and the operation of the piston through the action of the compensating attachment will in each case return the valve spindle to a neutral or cut-off position and render the regulator non-operative. It will be understood that if the flexible steel blade (47) were adjusted in a vertical line in relation to bar (42) that the pilot valve stem (24) once being moved to either effective positions for operating piston (19) could not be returned to a non-effective position, and piston (19) would make a complete stroke without cut-off effect. The studs alone if arranged in a vertical line will not accomplish this result. The angle of the blade (47) must be so adjusted as to effect the necessary cut-off motion. These studs simply act to give an abrupt motion to the cut-off mechanism so as to obtain step action.

It will be seen that the flexible blade can be formed into any desired curve to give the necessary variable control over the movement of piston rod (20) in relation to the movement of piston rod (12). It will be seen that this blade can be adjusted to a vertical line for a given distance corresponding to the necessary closing movement of the damper to obtain a grip on the draft. This means that there will be no cut-off or compensating effect up to this point, and from this point on the blade can be so adjusted as to effect a uniform variation in gas flow for a uniform variation in stoker speed.

One of the valuable features of this invention is to be able to apply a damper regulator to control each independent damper in a plurality of boilers, and to so control each damper in relation to the regulator which is controlled by the pressure as to compensate for variable gas flow from the furnace of the individual boiler.

The foregoing specifications with the accompanying drawings are presented for the purpose of describing and illustrating the broad principles of this invention, and I desire to have it understood that the invention is not to be restricted by reason of the specific construction or application disclosed or otherwise than as by the claims.

Having thus described my invention, what I claim as new and desire to secure by Letters Patent, is:—

1. In a regulator comprising a reversible motor and an operating element for controlling said motor, a cam member for actuating said operating element, and an adjustable compensator operated by said motor co-acting with said cam whereby the operating element is jointly controlled by said cam and by the operation of said motor to effect a variable step by step control of said motor.

2. In combination with a regulator controlled from fluid pressure, a second regulator comprising of a reversible motor and an operating element for controlling a source of power to actuate said motor, means controlled by the first named regulator to operate the operating element, and an adjustable compensator operated by said motor co-acting with said means whereby the operating element is controlled jointly by the first named regulator and by the motor to effect a variable step by step control of said motor.

3. In apparatus for controlling combustion in a boiler furnace, in combination a regulator controlled in accordance with variations in pressure, a second regulator having a reversible motor and an operating element for controlling said motor, means operated by the first named regulator for operating the operating element for controlling a source of power to operate said motor, and means operated by the motor for effecting a variable control of said regulator in relation to the first named regulator.

4. In a pressure system, means to regulate the pressure in the system comprising a regulator controlled from variations of pressure in the said system, a second regulator having a reversible motor and an operating element for controlling a source of power to operate said motor, means operated by the first named regulator for operating the operating element and means operated by the motor co-acting with said means to effect a variable control of said regulator in relation to the movement of the first named regulator.

5. In apparatus for controlling combustion in a boiler furnace, in combination a regulator controlled in accordance with variations in pressure, a second regulator having reversible motor and operating element for controlling said motor, mechanical means operated by the first named regulator for operating the operating element to control a source of power to operate the motor, and compensating means operated by the motor for effecting the incremental control of said regulator.

6. In a system for controlling fuel feed and air supply to a plurality of boiler furnaces comprising a separate reversible motor for controlling the air controlling means of each boiler furnace, said motors having an operating element for controlling the motor and its direction of operation, a master regulator for controlling the fuel feed and the operating elements of said motors simultaneously, said master regulator being controlled by variations in pressure generated by all of said boilers, an adjustable compensator operated by each of said motors co-acting with the operating element whereby the motors are controlled in abrupt steps of varying amounts, whereby the air controlling means is variably controlled to compensate for variable factors between the fuel feed and air supply.

7. In combination with a regulator controlled from fluid pressure, a second regulator comprising a reversible motor and an operating element for controlling a source of power to operate said motor, said operating element having a neutral position in which it is not effective for operating the motor and two effective positions for operating the motor and for controlling its direction of operation, means operated by the first named regulator for operating the operating element to either of its effective positions, and means operated by the motor for effecting a variable control of the motor in relation to the movement of the first named regulator.

8. In a regulator comprising a reversible motor and an operating element for controlling a source of power to operate said motor, said operating element having a neutral position in which the motor is not effective, and two effective positions for operating the motor, and controlling its direction of operation, remote control means for uniformly operating the operating element to either of its effective positions, and variable control means operated by the motor co-acting with said uniform control means whereby the motor is variably controlled in relation to the motor control means.

JAMES LEWIS KIMBALL.